(12) United States Patent
Tailor

(10) Patent No.: US 7,414,998 B2
(45) Date of Patent: Aug. 19, 2008

(54) DATA COMMUNICATION WITH A RESPONDER DEVICE ARRANGED TO SEND NON-BLUETOOTH DATA VIA A BLUETOOTH INQUIRY PROCESS

(75) Inventor: Mahendra J Tailor, Middlesex (GB)

(73) Assignee: Ezurio Limited, London, England (GB)

( * ) Notice: Subject to any disclaimer, the term of this patent is extended or adjusted under 35 U.S.C. 154(b) by 501 days.

(21) Appl. No.: 10/995,014

(22) Filed: Nov. 22, 2004

(65) Prior Publication Data

US 2005/0143006 A1    Jun. 30, 2005

(30) Foreign Application Priority Data

Nov. 25, 2003    (GB) ..................... 0327430

(51) Int. Cl.
*H04Q 7/24* (2006.01)

(52) U.S. Cl. ...................... 370/338

(58) Field of Classification Search ............. 370/338; 455/41.2

See application file for complete search history.

(56) References Cited

U.S. PATENT DOCUMENTS 7,215,976 B2 *   5/2007   Brideglall ............... 455/552.1
2002/0175819 A1  11/2002  Joo

FOREIGN PATENT DOCUMENTS

WO    WO 02/01814 A2    1/2002
WO    WO 02/39484 A     5/2002

* cited by examiner

*Primary Examiner*—Vincent P. Harper
*Assistant Examiner*—Gary Au
(74) *Attorney, Agent, or Firm*—Alston & Bird LLP

(57) ABSTRACT

A Bluetooth responder device for transmitting non-Bluetooth related data is disclosed. The device (2) comprises means for receiving non-Bluetooth data to be sent, means for receiving an incoming Bluetooth inquiry packet, means for generating a Bluetooth FHS packet to be sent in response to the incoming Bluetooth inquiry packet, which FHS packet represents data received via the input; and means for sending the generated Bluetooth FHS packet. The non-Bluetooth data may be carried in an undefined field of the FHS packet.

29 Claims, 6 Drawing Sheets

DATA COMMUNICATION WITH A RESPONDER DEVICE ARRANGED TO SEND NON-BLUETOOTH DATA VIA A BLUETOOTH INQUIRY PROCESS

BACKGROUND OF THE INVENTION

This invention relates to data communication. In particular the invention relates to data communication making use of the Bluetooth protocol.

Bluetooth is a widely used wireless communications medium which is extremely versatile and therefore can be used in a wide number of different circumstances. However, one of the issues with Bluetooth communication is that the establishment of a Bluetooth connection carries with it a significant processing overhead. The Bluetooth standard provides for one way around this problem in that two Bluetooth communication devices may be "bonded" to one another such that they may only communicate with one another. Once this bonding has taken place, communication between those two devices is simplified. This bonding process is used, for example, where wireless headphones are to communicate with a mobile telephone or other such source.

However, if there is a desire to communicate between one central or host device and a plurality of remote or slave devices, then this bonding process is of no use.

In such a circumstance, if conventional Bluetooth communication is used then there are two effects. Firstly, significant hardware must be provided at each location from which Bluetooth signals are to be sent, and secondly there is a significant time and power requirement associated with the overhead of establishing a Bluetooth connection. These factors can make conventional Bluetooth communications less than ideal in a situation where low cost transmission devices are required and perhaps only a small amount of data needs to be sent.

The present application relates to data communication mechanisms which make use of the Bluetooth protocol, but allow the transmission of data without the making of a Bluetooth ACL (Asynchronous Connection Less) connection.

To aid in understanding of the invention as described in further detail below, there follows a description of one aspect of the Bluetooth regime.

Bluetooth communication provides for ad hoc connections between peer devices. The ad hoc nature of the communication implies that the population of peer devices within range can, and often will, vary in time. This variation requires that Bluetooth devices have some means of determining at any time which devices are in the vicinity and ready to respond.

The procedure for discovering peer devices is called INQUIRY within the Bluetooth specification and devices which make themselves discoverable have to enable a mode called INQUIRY SCANNING to be able to participate in this inquiry process.

When a device needs to discover devices in the vicinity it sends out a radio packet repeatedly. This packet is known as an "ID Packet" and consists of 68 bits of information which have been chosen to provide an optimal auto-correlation coefficient. The 68 bits of information in the ID Packet has a form as shown in FIG. 1. Four trailer bits which are used in other parts of the Bluetooth regime are omitted and the 68 bits consist of a 64 bit "SYNC WORD", giving the good auto-correlation coefficient as mentioned above, and a four bit preamble.

When an ID Packet is received by a Bluetooth device in the appropriate state, which can be described as a Bluetooth Responder, that device or responder sends a response in the form of a Frequency Hop Sequence packet ("FHS Packet").

The FHS Packet consists of 144 bits of information padded with forward error correction bits to make an overall length of 240 bits.

The 144 bits of the FHS Packet are made up of many smaller concatenated packets of information. The make up of a FHS packet is shown in FIG. 2. All of the data which are included within the FHS packet relate to properties or parameters of one or other of the Bluetooth units. The system is thus a closed system, with all of the data in the FHS packet being generated internally by the Bluetooth system.

In the present application a field of interest is that labelled "Class of Device". This is a 24 bit field. Class of Device is described in the Bluetooth specification as a parameter used to indicate the capabilities of a device and is made up of sub-fields as shown in FIG. 3.

In the present application, the major device class sub-field which consists of 5 bits and the minor device class sub-field which consists of 6 bits are of particular interest. These bits can be used to indicate the device class of a responder. However, in some circumstances there is no need to transmit this 6 bit field, and in such a case the major device class sub-field may be set to indicate an unclassified device class. In this circumstance the 6 bits in the minor device class field are not defined in the Bluetooth specification and so can be set to anything and used for an alternative purpose.

SUMMARY OF THE INVENTION

According to one aspect of the present invention there is provided a responder device arranged to respond to incoming Bluetooth inquiry packets by outputting Bluetooth FHS packets, the responder device comprising at least one input for receiving non-Bluetooth data and a control unit arranged to represent data, received via the input, in output FHS packets.

According to another aspect of the present invention there is provided a method of sending non-Bluetooth data via a Bluetooth inquiry process comprising the steps of:
receiving non-Bluetooth data to be sent via an input;
receiving an incoming Bluetooth inquiry packet;
generating a Bluetooth FHS packet to be sent in response to the incoming Bluetooth inquiry packet, which FHS packet represents data received via the input; and
sending the generated Bluetooth FHS packet.

According to another aspect of the present invention there is provided data communication apparatus comprising a central device and at least one responder device from which data is to be sent to the central device;
the central device being arranged for sending Bluetooth inquiry packets and receiving Bluetooth FHS packets;
the responder device being arranged to respond to incoming Bluetooth inquiry packets by outputting Bluetooth FHS packets; and
the responder device comprising at least one input for receiving non-Bluetooth data and a control unit arranged to represent data, received via the input, in output FHS packets, such that data received via the input of the responder device may be communicated to the central device.

According to another aspect of the present invention there is provided a method of communicating non-Bluetooth data from at least one responder device to a central device comprising the steps of:
at the responder device, receiving non-Bluetooth data, via a respective input, which is to be sent to the central device;
sending at least one Bluetooth inquiry packet from the central device;
receiving the Bluetooth inquiry packet at the responder device and in response to this packet, generating, at the responder device, a Bluetooth FHS packet which represents the data received via the input and sending the generated Bluetooth FHS packet from the responder device; and receiving the FHS packet at the central device and extracting the data sent.

These methods and apparatus facilitate the communication of data using aspects of the Bluetooth regime without the need to establish Bluetooth connections. The data to be sent is "piggybacked" onto the existing protocol.

In many systems there will be a plurality of responder devices each of which comprises a respective input for receiving data and has the capability to send Bluetooth FHS packets representing data received via the input in response to Bluetooth inquiry packets. In this way the central device can receive data from a plurality of responder devices again without the need for making an ACL Bluetooth connection.

By "non-Bluetooth data" it is preferably meant that the data are not related to the Bluetooth inquiry process, and/or that the data are not properties or parameters of a Bluetooth unit. The data to be sent can be considered as external data which of course is in contradistinction to data relating to the Bluetooth regime which is generally carried by FHS packets. The data to be communicated may be termed i/o (input/output) data. The FHS packet carrying the data can be considered as a modified FHS packet, since it contains data which would not normally be part of an FHS packet.

The data to be carried in the FHS packet may be carried in an undefined field of the FHS packet. The data to be carried in the FHS packets may be carried in the "class of device" field. More particularly, the data may be carried in the "minor device class" subfield and the "major device class" subfield may be set to "unclassified".

The data to be carried in the FHS packet may be inserted into the FHS packet without passing through the Bluetooth stack. For example, the data to be carried in the FHS packet may be inserted directly into the FHS packet. By inserting the data into the FHS packet without passing through the Bluetooth stack, the data can be sent within a single response, which can reduce the time required to send the data, and reduce the power consumption. By contrast, if the data were to be transmitted via the Bluetooth stack a large number of communications would be required before a channel was set up to transmit the data, which would increase the transmission time and draw more power.

The invention may therefore also provide a Bluetooth transmission system that reduces the power requirements of a transmitting device by employing a method of shortening the transmission sequence by directly inputting data into an FHS packet. Such a scheme may bypass the Bluetooth protocol by incorporating an input to receive data and a control unit that is capable of inserting this data automatically into the undefined fields of the FHS packet, thus transferring data over the Bluetooth link without the need to establish a higher level connection.

The responder may be arranged to accept digital input signals and/or analogue input signal for representation in the FHS packet.

The responder may comprise a serial cable connector and the inputs may comprise respective terminals in the serial cable connector.

The responder and/or central device may comprise a Bluetooth serial module which is arranged to provide an interface between serial cable signals and Bluetooth wireless signals.

One type of Bluetooth serial module which may be adapted by suitable software to embody the present invention is available commercially from Ezuria Ltd. of Unit 2, 126 Clindale Avenue, London NW9 5HD.

It should be noted however that the use of Bluetooth serial modules is not an essential feature of the present invention and in many implementations, even if Bluetooth serial modules are used for the or each responder, a general purpose Bluetooth enabled device will often be used as the central device.

According to another aspect of the present invention there is provided a data monitoring arrangement comprising data communication apparatus as defined above and at least one sensing device connected to at least one input of the responder such that an output of the sensing device may be received via the responder and data representative of that output sent to the central device as part of a FHS signal.

Preferably the monitoring arrangement comprises a plurality of sensing devices each of which is connected to at least one input of a respective responder so that the central device may receive data representative of the outputs of each of the sensing devices via respective FHS signals.

Where the or each responder device is a Bluetooth serial module, the sensing device may be connected to the responder via a serial cable.

In some cases, for example where a Bluetooth serial module is used as a responder device, the sending of data by the mechanism described above may be auxiliary to the sending of data via a Bluetooth connection. To put this another way, the present mechanism may be used in a set up where, a first class of data is sent using FHS signals and a full Bluetooth connection is used to send a second class of data. For example, the first class of data may comprise regular monitoring data and the second class of data may comprise configuration data. In this way the first class of data may be sent significantly faster than would otherwise be possible by using a modified FHS packet, and a full Bluetooth connection may optionally be used to send a second class of data. The full Bluetooth connection may, of course, be used to send data in both directions.

According to a further aspect of the present invention there is provided a responder device comprising, control means arranged to respond to incoming Bluetooth inquiry packets by outputting Bluetooth FHS packets, and at least one input for receiving data, the control means being further arranged to represent data, received via the input, in output FHS packets.

According to yet another aspect of the present invention there is provided a method of sending i/o data using a Bluetooth inquiry process comprising the step of representing the i/o data to be sent in a Bluetooth FHS packet.

BRIEF DESCRIPTION OF THE DRAWINGS

An embodiment of the present invention will now be described, by way of example only, with reference to the accompanying drawings in which.

DETAILED DESCRIPTION OF EMBODIMENTS OF THE INVENTION

Figure 1:
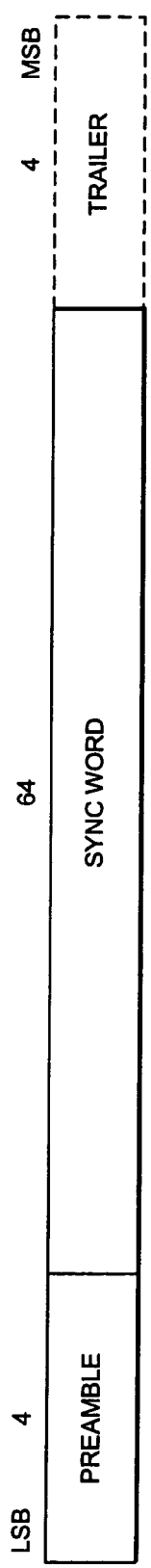
FIG. 1 illustrates the make-up of a Bluetooth ID Packet.
Figure 2:
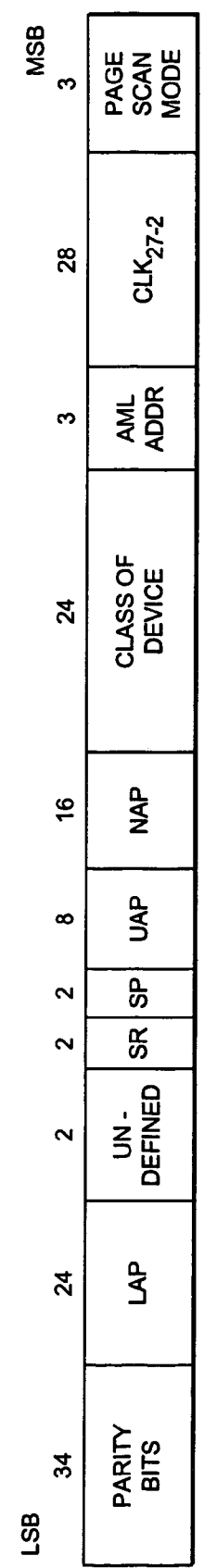
FIG. 2 illustrates the make-up of a Bluetooth FHS Packet.
Figure 3:
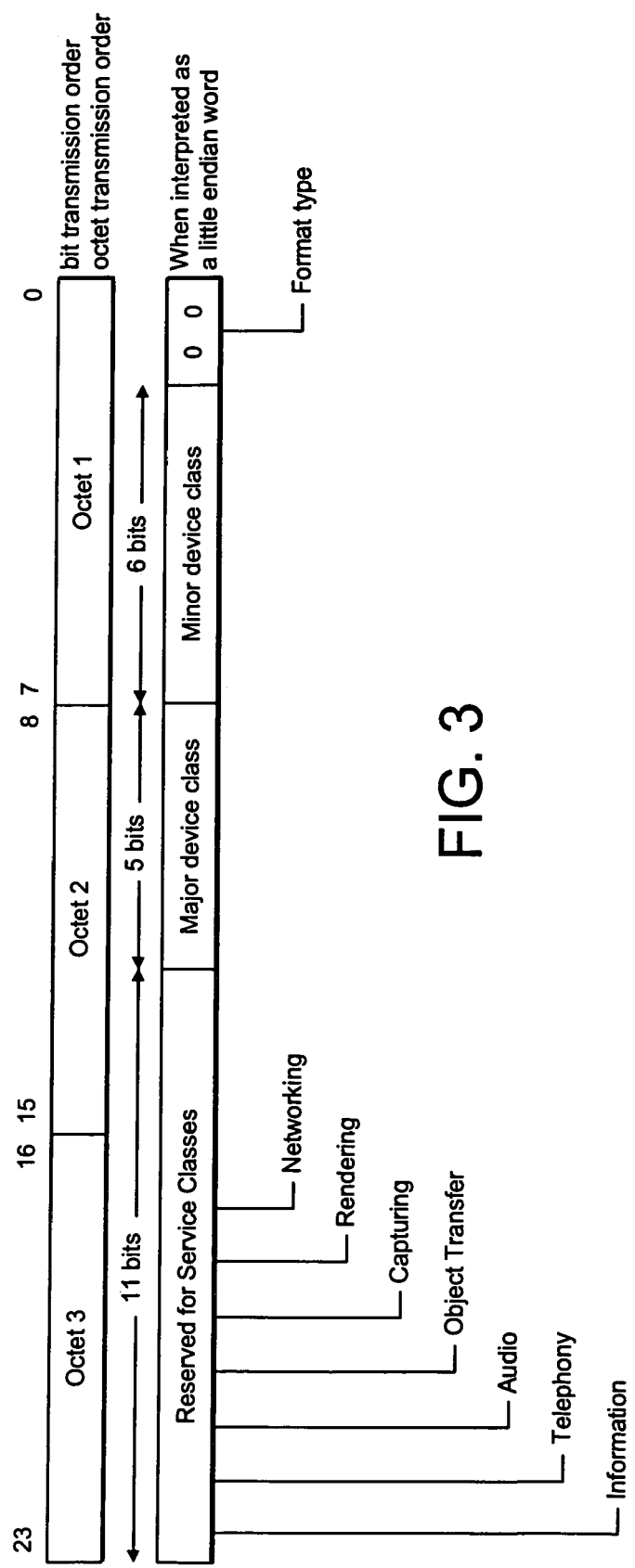
FIG. 3 shows the make-up of a field known as Class of Device in a Bluetooth FHS Packet.
Figure 4:
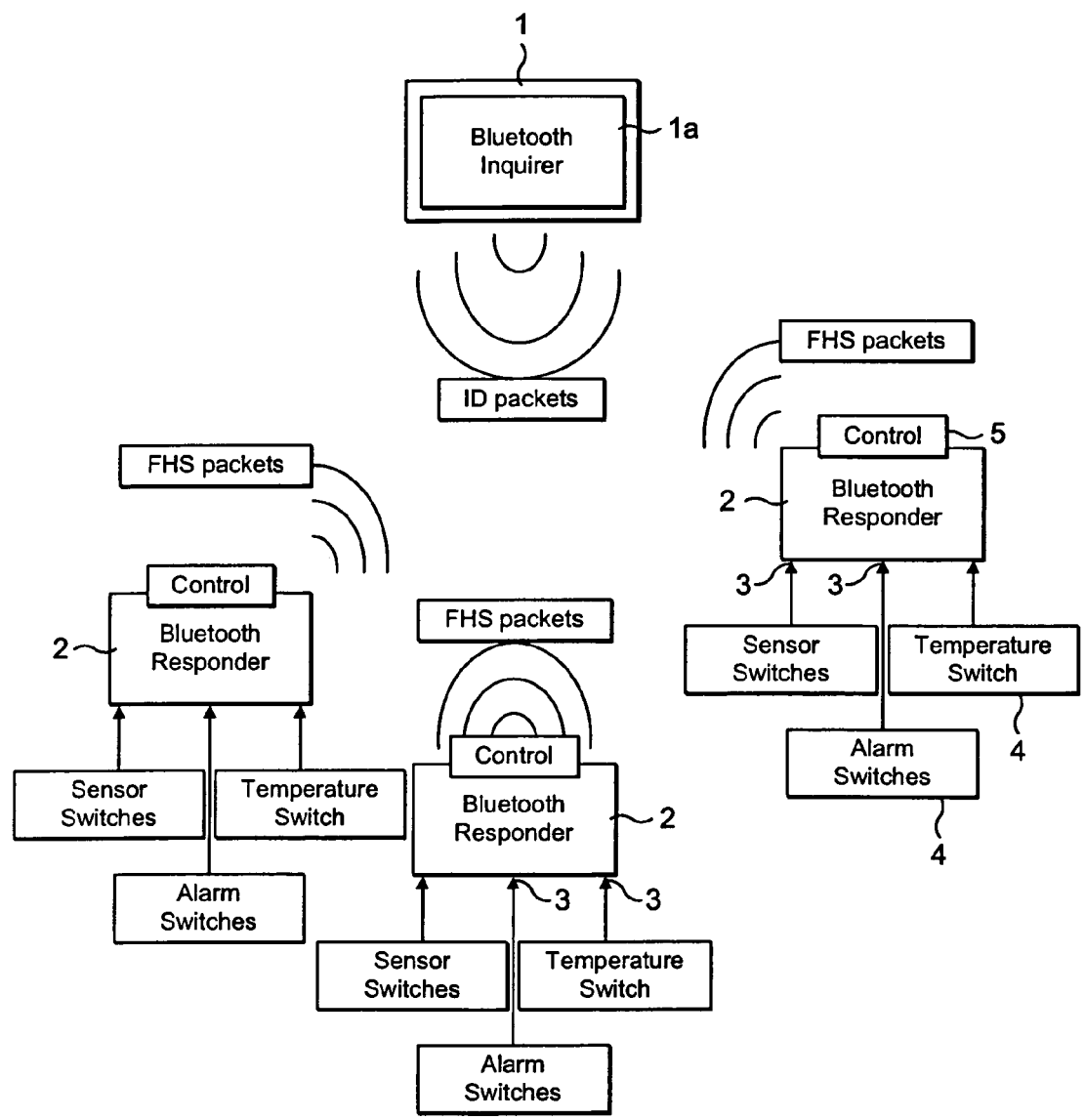
FIG. 4 shows a data monitoring arrangement.

FIG. 4 shows a data monitoring arrangement in which there is one central Bluetooth enabled device 1 and a plurality of Bluetooth responder devices 2 which are arranged for sending i/o data to the central device 1.

Each of the Bluetooth responder devices 2 comprises a plurality of inputs 3 via which i/o data (or external data) in the form of outputs from respective sensors 4 may be received.

In the present embodiment the sensors 4 are shown to comprise sensor switches, alarms switches and temperature switches. These are included only by way of example and in the present application and invention the type of sensors used and the source of the i/o data input into the Bluetooth responder 2 is of no great relevance. It is, however, important to note that the data received by these inputs 3 is data which is external to the Bluetooth signalling process itself. That is to say it is not data which characterises the Bluetooth process or devices, but rather is data having some external significance.

There are a wide variety of different commercial/technical fields in which the present ideas can be implemented and the nature of the sensing devices 4 will be largely dictated by those applications. For example, in the field of industrial automation the system could be used for remotely sensing instrumentation. As another example, the ideas may be used in security systems and in such a case the sensor devices 4 could be used for sensing the state of alarm switches. In another example the ideas could be used for remotely sensing if cash machines are open or closed.

The central Bluetooth device 1 comprises a Bluetooth inquirer module 1a arranged to send out ID Packets of the type described above in the conventional way.

Similarly, the Bluetooth responder devices 2 are arranged to transmit Bluetooth FHS Packets on receipt of an appropriate ID Packet.

Each Bluetooth responder device 2 comprises a control unit 5 which is arranged for receiving data via the inputs 3 and representing this data in FHS Packets output by the respective responder 2.

In particular, the control unit 5 functions by setting the major device class field to unclassified and using the 6 bit sub-field called minor device class to represent the sensor data.

Thus, in effect, the outputs of the external sensors are mapped to the 6 bits of information carried in the minor device class sub-field.

This means that when FHS Packets are sent in response to ID Packets received from the central Bluetooth device 1, data representing the state of the sensor or sensors 4 connected to the inputs 3 can be communicated to the central Bluetooth device 1.

The central Bluetooth device of course needs to be appropriately configured to recognise and extract this data from the FHS Packets. This extraction of the data may take place in the central Bluetooth device 1 itself, or another device to which the central Bluetooth device is connected. In general terms, there will be a Bluetooth inquiry host application resident on the central Bluetooth device 1 which is arranged to extract the i/o data from the incoming FHS Packets.

It will be recognised that this mechanism allows data to be sent as part of the Bluetooth inquiry process without any Bluetooth connection being made. However, it will further be realised that it is also possible for the Bluetooth central device 1 and Bluetooth responders 2, if appropriately configured, to form a Bluetooth connection and send information via this connection. Situations where this capability might be of use can be envisaged. An example might be where there is regular need to send small amounts of data which can be represented in the minor device class sub-field and less frequent occasions where larger chunks of data need to be sent which can be sent using the Bluetooth connection.

However, in alternative implementations, each Bluetooth responder 2 may be configured in such a way that it is incapable of forming a Bluetooth connection proper, but rather just has the capability of responding to incoming ID Packets with out going FHS Packets carrying the appropriate i/o data. If this is the case it can lead to the provision of simplified Bluetooth responders where the hardware required and/or software configuration required for these devices is much less than if Bluetooth connections are to be possible.

Figure 5:
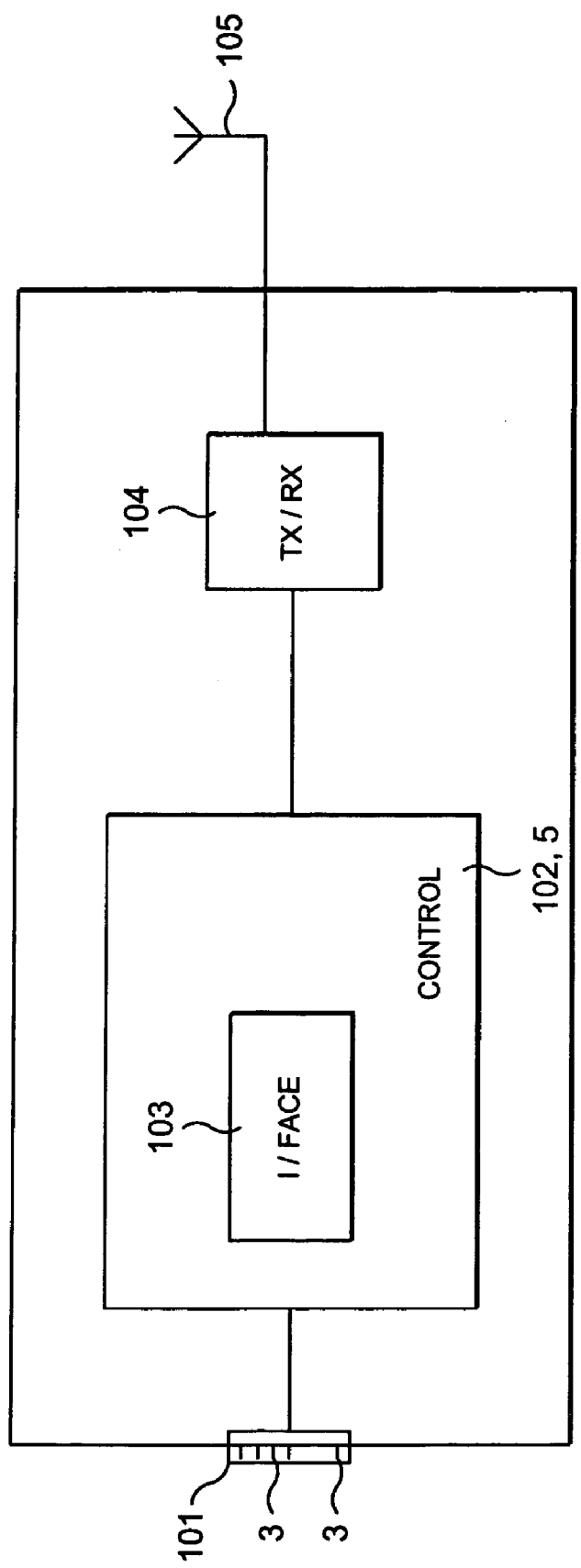
FIG. 5 shows a Bluetooth serial module which may be used as a Bluetooth responder in the data monitoring arrangement shown in FIG. 4.

The Bluetooth responders 2 themselves may be implemented in various different forms, in one implementation, each Bluetooth responder 2 comprises a Bluetooth serial module of the type shown in FIG. 5.

A Bluetooth serial module is a device which is arranged for acting as an interface between serial cable signals and Bluetooth signals. Such Bluetooth serial modules can in some instances be used to replace serial cables to convert a cabled system into a wireless system. In such a case, a serial cable is connected to one Bluetooth serial module at an appropriate first location and there is provided a second Bluetooth serial module at a second location to which a second serial cable connection is made. In such a case the Bluetooth connection can replace part of a serial cable run in a way which is entirely transparent to the devices which are connected to the remote ends of the two pieces of serial cable. Such serial modules are commercially available and one such serial module is commercially available from TDK Systems Europe Ltd. In order to operate in accordance with the present invention it is necessary to reconfigure/reprogram such commercially available Bluetooth serial modules.

The serial Bluetooth module in the present embodiment generally comprises a serial cable connector 101, a control unit 102 which performs the function of the control unit 5 introduced above and comprises an interface 103 for converting serial cable signals to Bluetooth signals and vice versa, and Bluetooth transreceiver 104 with an associated antenna 105.

The serial cable connector 101 comprises a plurality of terminals and some of these terminals represent inputs 3 which may be used for receiving sensing data in carrying out the present invention. In the Bluetooth serial module available from TDK Systems Europe Ltd, the serial cable connector is in the form of a 40 way mini PCI connector having pin allocation shown in the table below. In the case of the TDK Bluetooth serial module, pins 1, 2, 3, 4, 6, 8, 10, 12, 14 and 16 act as inputs 3 which may be used for receiving i/o data in carrying out the invention.

| PinNo | Signal | Description | PinNo | Signal | Description |
|---|---|---|---|---|---|
| 1 | Analogue 0 | 1.8 v Max | 2 | GPIO1 | I/O for Host |
| 3 | Analogue 1 | 1.8 v Max | 4 | GPIO2 | I/O for Host |
| 5 | SPI_MISO | SPI bus serial O/P | 6 | UART_RI | Input or Output |
| 7 | SPI_CSB | SPI bus chip select I/P | 8 | UART_DCD | Input or Output |
| 9 | SPI_CLK | SPI bus clock I/P | 10 | UART-DSR | Input |
| 11 | GND | | 12 | GPIO3 | I/O for Host (Also DTR) |
| 13 | RESET | RESET I/P | 14 | GPIO4 | I/O for Host (Right LED) |
| 15 | GND | | 16 | GPIO5 | I/O for Host (Left LED) |
| 17 | SPI_MOSI | SPI bus serial I/P | 18 | GND | |
| 19 | UART_CTS | Clear to Send I/P | 20 | PCM_CLK | PCM Clock I/P |
| 21 | UART_TX | Transmit Data O/P | 22 | PCM_IN | PCM Data I/P |
| 23 | UART_RTS | Request to Send O/P | 24 | PCM_SYNC | PCM Sync I/P |
| 25 | UART_RX | Receive Data I/P | 26 | PCM_OUT | PCM Data O/P |
| 27 | VCC_3V3 | 3.3 V Output | 28 | N/C | |
| 29 | USB_5V | 3.6 V < VIN < 6.0 V | 30 | GND | |
| 31 | N/C | | 32 | RESERVED | Do Not Connect |
| 33 | N/C | | 34 | RESERVED | Do Not Connect |
| 35 | N/C | | 36 | GND | |
| 37 | N/C | | 38 | GND | |
| 39 | VCC 1V8 | 1.8 V Output | 40 | N/C | |

Where a TDK Bluetooth serial module is used as a responder, configuration registers in the serial module known as S Registers may be used to specify what information should be "piggybacked" into the appropriate bits of the minor device class sub-field, and also to specify the frequency with which these bits should be updated. Specifically, one register is used to specify the details of the information which should be represented and another is used to specify the frequency of updates. In particular, S Reg 556 is used in one implementation to specify the "what" information and S Reg 557 is used to specify the frequency of update in the range 4 to 900 seconds.

It will be seen that whilst Bluetooth serial modules may be used as Bluetooth responders in the present system, their use is not essential. Provided that the Bluetooth responders have the capability of receiving i/o data via appropriate inputs and representing this data in FHS Packets emitted in response to received Bluetooth ID Packets, then that is all that is needed.

In some cases the central device 1 may comprise a Bluetooth serial module and in particular this might be a TDK Bluetooth serial module.

It should be noted that whilst the central Bluetooth device 1 is shown as having a separate Bluetooth inquirer module and similarly whilst the Bluetooth responder devices are shown as including a control unit 5 and the serial module is shown as having a control unit 102 comprising an interface 103, and a transmitter 104, in each case these differentiations are used to indicate different functional aspects of the device and will not necessarily be reflected in hardware. That is to say there may, for example, be a single chip in any one of these devices which is programmed to carry out the functions of each of the respective parts of the device.

Figure 6:
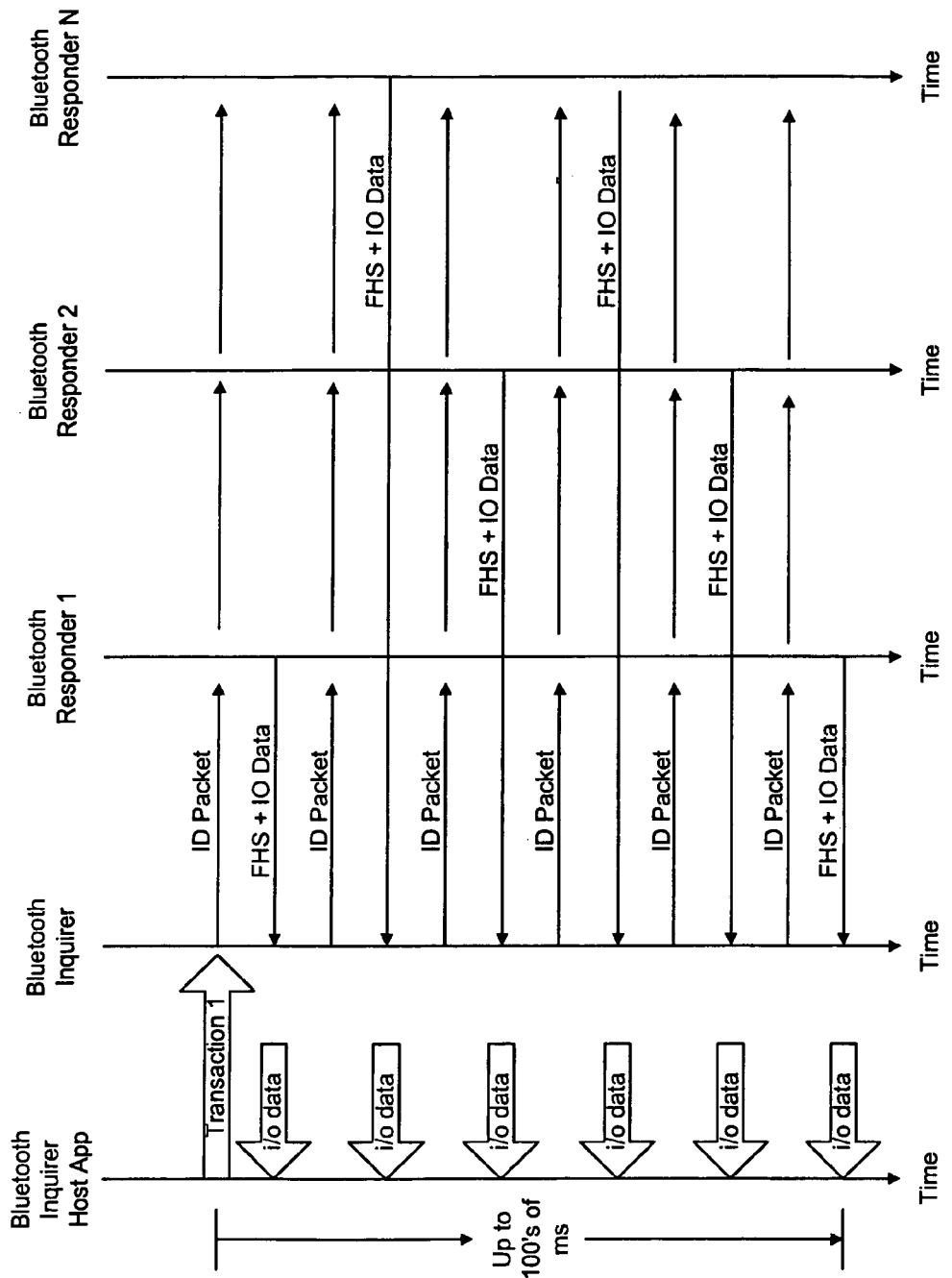
FIG. 6 is a timing chart showing the steps which occur in communication using the data monitoring arrangement shown in FIG. 4.

A particular advantage of the present mode of communication is that very quick access to the state of the sensors 4 may be obtained. This is because there is no need to make a Bluetooth connection before the information can be sent. FIG. 6 shows a timing chart which illustrates the actions which take place when the central Bluetooth device 1 wishes to obtain the i/o data from sensors 4 in its immediate environment.

In the process shown in FIG. 6, a host application resident on the central Bluetooth device 1 initiates a request for data from the sensors 4 (labelled transaction 1) and this causes the Bluetooth inquirer module 1A to issue successive ID Packets. As each of the Bluetooth responder devices 2 receives an ID Packet it responds with a respective FHS Packet including the i/o data received from its respective sensor or sensors 4. This process will continue as long as ID Packets are being issued by the Bluetooth inquirer, and as such, several FHS Packets may be received from each Bluetooth responder in a relatively short amount of time, for example, in a hundred or a few hundred milliseconds.

Figure 7:
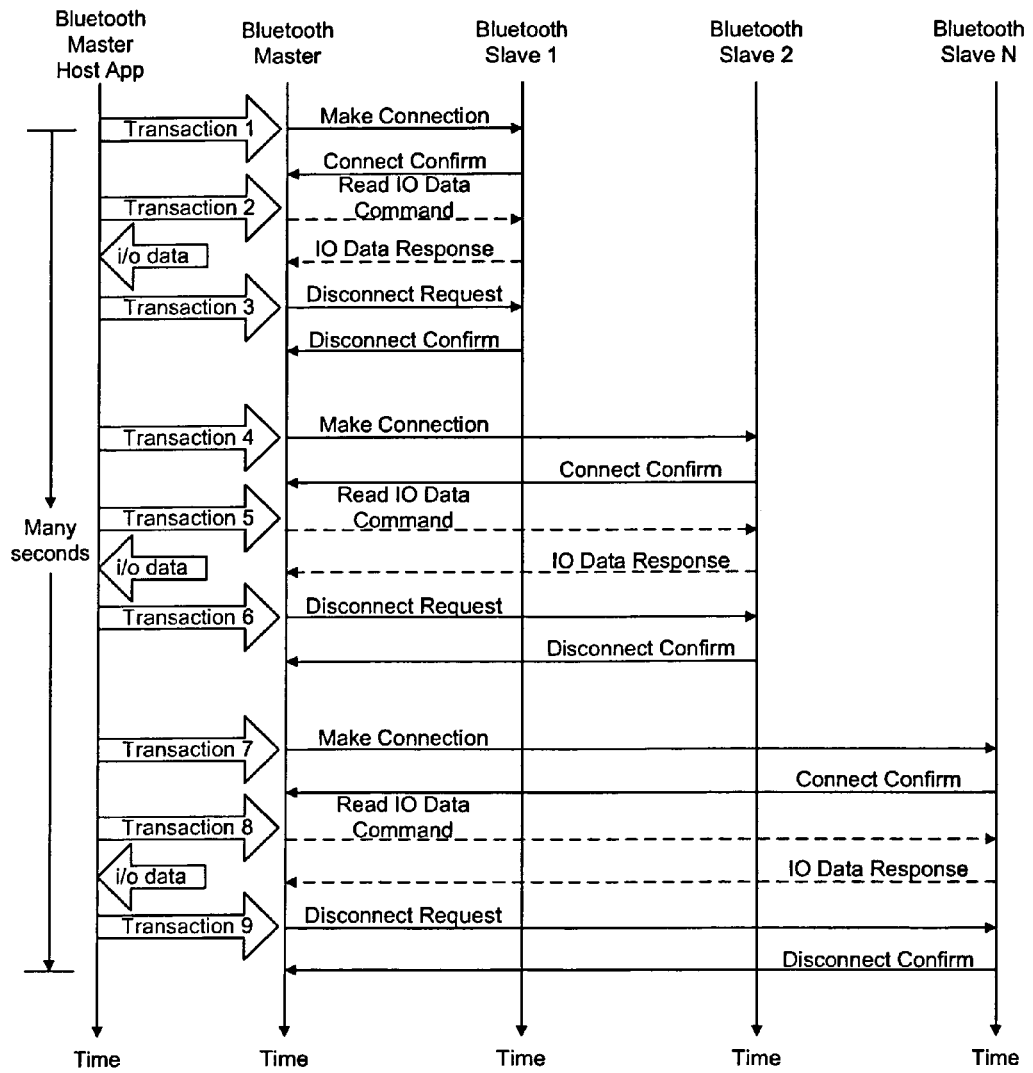
FIG. 7 shows a comparable timing chart showing the actions which would take place if the same data were to be transmitted using a conventional Bluetooth connection.

This situation contrasts to that which exists where a Bluetooth connection needs to be made in order to extract the same information. The process in such a case is shown in FIG. 7. In this case there will be a central Bluetooth device operating as a master and a plurality of separate Bluetooth slave devices in place of the Bluetooth responders. In this case many more steps are required to extract the information. In particular, a host application running on a Bluetooth master must initiate three transactions in order to extract the i/o data from a single slave. In a first transaction the host application has to request the making of a connection. In a second transaction the host application has to request delivery of the i/o data, and in a third transaction the host application has to request de-connection.

As well as these transactions, the slave receiving these instructions, of course, has to respond appropriately.

Moreover, as alluded to above, and as illustrated in FIG. 7, this series of steps has to be carried out separately in respect of each Bluetooth slave device which is configured to transmit i/o data.

The necessary time to extract the data from even three Bluetooth slave devices using Bluetooth connections will be in the order of seconds rather than milliseconds. In a situation where there are more remote sensors to be monitored, the situation when using conventional Bluetooth connections will become even worse.

When comparing the processes in FIG. 6 and FIG. 7 it will be noted that in the present method the status of a plurality of sensors communicating with the central device 1 via separate Bluetooth responders may be achieved by issuing a single command from the host application at the central device. By contrast where conventional Bluetooth connections are used, many commands are required.

The invention claimed is:

1. A responder device arranged to send non-Bluetooth data via a Bluetooth inquiry process, the responder device comprising:
   an input unit which receives non-Bluetooth data to be sent;
   a receiver which receives an incoming Bluetooth inquiry packet;
   a control unit which generates a Bluetooth FHS packet to be sent in response to the incoming Bluetooth inquiry packet, which FHS packet represents data received via the input unit, wherein the control unit inserts the non-Bluetooth data into the FHS packet without said data passing through a Bluetooth stack; and
   a transmitter which sends the generated Bluetooth FHS packet.

2. A responder device according to claim 1, wherein the control unit inserts the non-Bluetooth data in an undefined field of the FHS packet.

3. A responder device according to claim 1, wherein the control unit inserts the non-Bluetooth data in the "class of device" field.

4. A responder device according to claim 3, wherein the control unit inserts the non-Bluetooth data in the "minor device class" subfield and sets the "major device class" subfield to "unclassified".

5. A responder device according to claim 1, wherein the control unit inserts the non-Bluetooth data directly into the FHS packet.

6. A responder device according to claim 1, wherein the input unit is arranged to accept digital input signals for representation in the FHS packet.

7. A responder device according to claim 1, wherein the input unit is arranged to accept analog input signals for representation in the FHS packet.

8. A responder device according to claim 1, wherein the input unit comprises a serial cable connector.

9. A responder device according to claim 1, wherein the responder device comprises a Bluetooth serial module which is arranged to provide an interface between serial cable signals and Bluetooth wireless signals.

10. A responder device according to claim 1, wherein a first class of data is sent using FHS signals and a full Bluetooth connection is used to send a second class of data.

11. A responder device according to claim 10, wherein the first class of data comprises regular monitoring data and the second class of data comprises configuration data.

12. A central Bluetooth device being arranged to send Bluetooth inquiry packets and to receive Bluetooth FUS packets, the central Bluetooth device comprising:
   a transmitter which sends Bluetooth inquiry packets;
   a receiver which receives Bluetooth FHS packets;
   a control unit which extracts non-Bluetooth data from a Bluetooth FHS packet wherein the non-Bluetooth data comprises data inserted into the FHS packet without said data passing through a Bluetooth stack; and
   an output terminal which outputs the extracted data.

13. Data communication apparatus comprising a central device and at least one responder device from which data is to be sent to the central device;
   the central device being arranged to send Bluetooth inquiry packets and to receive Bluetooth FHS packets;
   the responder device being arranged to respond to incoming Bluetooth inquiry packets by outputting Bluetooth FHS packets; and
   the responder device comprising at least one input unit for receiving non-Bluetooth data and a control unit arranged to represent data, received via the input, in output FHS packets, such that data received via the input unit of the responder device may be communicated to the central device, wherein the control unit inserts the non-Bluetooth data into the FHS packet without said data passing through a Bluetooth stack.

14. Data communication apparatus according to claim 13, wherein the control unit inserts the non-Bluetooth data in an undefined field of the FHS packet.

15. Data communication apparatus according to claim 13, wherein the control unit inserts the non-Bluetooth data in the "class of device" field.

16. Data communication apparatus according to claim 13, wherein the control unit inserts the non-Bluetooth data in the "minor device class" subfield and sets the "major device class" subfield to "unclassified".

17. Data communication apparatus according to claim 13, wherein the control unit inserts the non-Bluetooth data directly into the FHS packet.

18. Data communication apparatus according to claim 13, further comprising at least one sensing device connected to at least one input of the responder device such that an output of the sensing device may be received via the responder device and data representative of that output sent to the central device as part of a FHS signal.

19. Data communication apparatus according to claim 13, further comprising a plurality of sensing devices each of which is connected to at least one input of a respective responder so that the central device may receive data representative of the outputs of each of the sensing devices via respective FHS signals.

20. Data communication apparatus according to claim 19, wherein the or each responder device is a Bluetooth serial module, and the sensing device is connected to the responder via a serial cable.

21. Data communication apparatus according to claim 13, wherein a first class of data is sent using FHS signals and a full Bluetooth connection is used to send a second class of data.

22. Data communication apparatus according to claim 21, wherein the first class of data comprises regular monitoring data and the second class of data comprises configuration data.

23. A method of sending non-Bluetooth data via a Bluetooth inquiry process comprising the steps of:

receiving non-Bluetooth data to be sent via an input;
receiving an incoming Bluetooth inquiry packet;
generating a Bluetooth FHS packet to be sent in response to the incoming Bluetooth inquiry packet, which FHS packet represents data received via the input, wherein the non-Bluetooth data is inserted into the FHS packet without said data passing through a Bluetooth stack; and
sending the generated Bluetooth FHS packet.

24. A method according to claim 23, wherein the non-Bluetooth data are inserted in an undefined field of the FHS packet.

25. A method according to claim 23, wherein the non-Bluetooth data are inserted in the "class of device" field.

26. A method according to claim 25, wherein the non-Bluetooth data are inserted in the "minor device class" subfield and the "major device class" subfield is set to "unclassified".

27. A method according to claim 23, wherein the non-Bluetooth data is inserted directly into the FHS packet.

28. A method of communicating non-Bluetooth data from at least one responder device to a central device comprising the steps of:
   at the responder device, receiving non-Bluetooth data, via a respective input, which is to be sent to the central device;
   sending at least one Bluetooth inquiry packet from the central device;
   receiving the Bluetooth inquiry packet at the responder device and in response to this packet, generating, at the responder device, a Bluetooth FHS packet which represents the data received via the input and sending the generated Bluetooth FHS packet from the responder device, wherein the non-Bluetooth data is inserted into the generated Bluetooth FHS packet without said data passing through a Bluetooth stack; and
   receiving the FHS packet at the central device and extracting the data sent.

29. Apparatus for sending non-Bluetooth data via a Bluetooth inquiry process comprising:
   means for receiving non-Bluetooth data to be sent;
   means for receiving an incoming Bluetooth inquiry packet;
   means for generating a Bluetooth FHS packet to be sent in response to the incoming Bluetooth inquiry packet, which FHS packet represents data received via the input, wherein the non-Bluetooth data is inserted into the FHS packet without said data passing through a Bluetooth stack; and
   means for sending the generated Bluetooth FHS packet.

* * * * *

UNITED STATES PATENT AND TRADEMARK OFFICE
CERTIFICATE OF CORRECTION

| | | |
|---|---|---|
| PATENT NO. | : 7,414,998 B2 | Page 1 of 1 |
| APPLICATION NO. | : 10/995014 | |
| DATED | : August 19, 2008 | |
| INVENTOR(S) | : Tailor | |

It is certified that error appears in the above-identified patent and that said Letters Patent is hereby corrected as shown below:

Column 10,

Line 5, "FUS" should read --FHS--.

Signed and Sealed this

Ninth Day of December, 2008

JON W. DUDAS
*Director of the United States Patent and Trademark Office*